3,193,558
PROCESS FOR THE PRODUCTION OF 2-CYANO-
METHYLENE-4-THIAZOLIDINONES
Gerhard Satzinger, Memmingen, Allgau, Germany,
assignor to Warner-Lambert Pharmaceutical Company, Morris Plains, N.J., a corporation of Delaware
No Drawing. Filed May 31, 1963, Ser. No. 284,355
2 Claims. (Cl. 260—306.7)

This invention relates to a new and novel process for the production of 2-cyanomethylene-4-thiazolidinone having the structural formula:

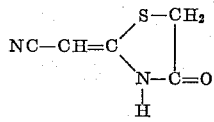

2-cyanomethylene-4 - thiazolidinone exhibits significant pharmacological properties and is useful as a tranquilizer and as a diuretic. In addition, it is an important intermediate for the production of other pharmacologically active thiazolidinones. It is, accordingly, an important object of this invention to provide an efficient and economical process for its production.

It has now been found that 2-cyanomethylene-4-thiazolidinone may be prepared by reacting cyanothioacetamide with chloroacetic acid employing dimethylformamide as the reaction medium. The reaction which occurs may be represented by the following:

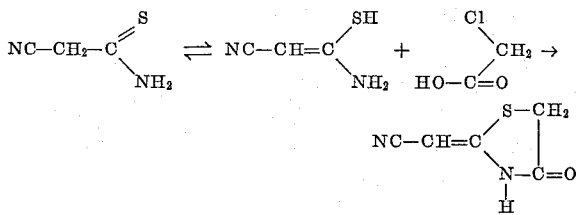

The reaction is generally carried out by refluxing cyanothioacetamide and chloroacetic acid in equi-molar ratio in an organic solvent system at a temperature of from 110 to 150° C. for from about 1 to 3 hours employing a solvent medium consisting of dimethylformamide; the reaction is carried out at a temperature of about 140° C. for a period of about 130 minutes. The desired reaction product can be conveniently recovered from the reaction mixture by removing the solvent, taking up the residue in an aqueous solution of sodium carbonate and then precipitating the product from solution by addition of a mineral acid. The precipitate thus obtained can be purified by recrystallization from a solvent such as ethanol.

In order to further illustrate this invention, the following example is given:

*Example 1*

A solution of 10.1 grams (0.1 mole) of cyanothioacetamide and 9.5 grams (0.1 mol) of chloroacetic acid in 100 ml. of dimethylformamide is heated under reflux to 140° C. for about 130 minutes. The solvent is then removed under reduced pressure and the residue remaining is dissolved in about 100 ml. of a warm aqueous 5% solution of sodium carbonate. On acidifying this basic solution, the desired 2-cyanomethylene-4-thiazolidinone readily precipitates out of solution. The precipitated product is collected by filtration and recrystallized twice from 80% ethanol, M.P. 187° C.

Analysis for $C_5H_4N_2OS$ (M.W. 140.2) — Calc'd:

C=42.83; H=2.88; N=20.00; S=22.85.

Found: C=43.03; H=3.14; N=19.70; S=22.44.

It is to be understood that the foregoing detailed description is given merely by way of illustration and that many variations may be made therein without departing from the spirit of my invention.

Having described my invention, what I desire to secure by Letters Patent is:

1. Process for the production of 2-cyanomethylene-4-thiazolidinone which comprises reacting cyanothioacetamide and chloroacetic acid under reflux in dimethylformamide.

2. Process in accordance with claim 1 wherein said cyanoacetamide and chloroacetic acid are employed at equi-molar ratio.

References Cited by the Examiner
UNITED STATES PATENTS 3,072,653   1/63   Satzinger _____ 260—306.7

OTHER REFERENCES

Elderfield, Heterocyclic Compounds, vol. 5 (New York, 1957), pages 496–499 and 713.

Weissberger et al., Techniques of Organic Chemistry, vol. VII, "Organic Solvents" (New York, 1955), pages 244 and 450.

NICHOLAS S. RIZZO, *Primary Examiner.*